US011329472B2

(12) United States Patent
Roy et al.

(10) Patent No.: US 11,329,472 B2
(45) Date of Patent: May 10, 2022

(54) METHODS AND APPARATUS TO PREVENT UNDESIRED TRIGGERING OF SHORT CIRCUIT OR OVER CURRENT PROTECTION

(71) Applicant: Texas Instruments Incorporated, Dallas, TX (US)

(72) Inventors: Subrato Roy, Bangalore (IN); Ankur Chauhan, Bangalore (IN); Vishal Gupta, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 59 days.

(21) Appl. No.: 16/428,493

(22) Filed: May 31, 2019

(65) Prior Publication Data

US 2020/0028345 A1    Jan. 23, 2020

(30) Foreign Application Priority Data

Jul. 20, 2018 (IN) .............................. 201841027168

(51) Int. Cl.
  *H02H 1/04* (2006.01)
  *H02H 7/20* (2006.01)
  *H02H 3/28* (2006.01)
  *H02H 1/00* (2006.01)

(52) U.S. Cl.
  CPC ............ *H02H 1/04* (2013.01); *H02H 1/0007* (2013.01); *H02H 3/28* (2013.01); *H02H 7/20* (2013.01)

(58) Field of Classification Search
  CPC .......... H02H 1/04; H02H 1/0007; H02H 3/28; H02H 7/20
  See application file for complete search history.

(56) References Cited

U.S. PATENT DOCUMENTS

| 7,826,237 | B2* | 11/2010 | Zhang | ............... | H02M 3/33507 363/21.12 |
| 8,279,631 | B2* | 10/2012 | Yang | ................. | H02J 7/007182 363/20 |
| 10,396,571 | B2* | 8/2019 | Rana | ...................... | H02J 7/0029 |
| 2004/0095020 | A1* | 5/2004 | Kernahan | ............. | H02M 3/157 307/35 |

(Continued)

OTHER PUBLICATIONS

Maxim Integrated, "MAX15090/MAX15090A 2.7 to 18V, 12A, Hot-Swap Solution with Current Report Output," Jan. 2015, (15 pages).

(Continued)

*Primary Examiner* — Nguyen Tran
(74) *Attorney, Agent, or Firm* — Ray A. King; Charles A. Brill; Frank D. Cimino

(57) ABSTRACT

Methods, apparatus, systems and articles of manufacture are disclosed for preventing undesired triggering of short circuit or over current protection. An example apparatus includes an output terminal; a voltage detection device coupled to a voltage detection input terminal and the output terminal and including a voltage detection output coupled to a logic gate first input terminal; a pulse extender coupled between a logic gate output and a selecting node; a multiplexer coupled to the selecting node and configured to be coupled to a first protection circuit, a second protection circuit, and a driver; and a switch coupled between an input terminal and the output terminal and including a switch gate terminal coupled to the driver.

16 Claims, 10 Drawing Sheets

(56) References Cited

U.S. PATENT DOCUMENTS

| | | | | |
|---|---|---|---|---|
| 2011/0267726 A1* | 11/2011 | Ikeuchi | ................ | H01M 10/48 |
| | | | | 361/63 |
| 2018/0316180 A1* | 11/2018 | Batenburg | ............... | H02H 3/20 |
| 2019/0098404 A1* | 3/2019 | Lee | ...................... | H02H 1/0007 |
| 2019/0109451 A1* | 4/2019 | Takemura | ................ | H02H 3/05 |
| 2020/0112264 A1* | 4/2020 | Arima | ................. | H02H 1/0007 |

OTHER PUBLICATIONS

Monolithic Power Systems, "MP5022A 12V, 3mΩ RDS(ON), Hot-Swap Protection Device With Current Monitoring," May 15, 2014, (20 pages).

Monolithic Power Systems, "MP5022C 12V, 3mΩ RDS(ON), Hot-Swap Protection Device with Current Monitoring," May 26, 2016, (22 pages).

Texas Instruments, "TPS2662x 60-V, 800-mA Industrial eFuse with Integrated Input and Output Reverse Polarity Protection," Oct. 2017, (47 pages).

Texas Instruments, "TPS2475x 12-A eFuse Circuit Protector with Current Monitor," Oct. 2013, (47 pages).

\* cited by examiner

METHODS AND APPARATUS TO PREVENT UNDESIRED TRIGGERING OF SHORT CIRCUIT OR OVER CURRENT PROTECTION

RELATED APPLICATION

This patent arises from a continuation of Indian Provisional Patent Application Number 201841027168, which was filed on Jul. 20, 2018. Indian Provisional Patent Application Number 201841027168 is hereby incorporated herein by reference in its entirety. Priority to Indian Provisional Patent Application Number 201841027168 is hereby claimed.

FIELD OF THE DISCLOSURE

This disclosure relates generally to circuit protection, and, more particularly, to prevent undesired triggering of short circuit or over current protection.

BACKGROUND

A short circuit is an unintended connection between a power supplying net and another net, such as ground. Short circuits can damage power supply devices because the devices are not designed to handle large currents associated with a short circuit. A short circuit protection circuit is used to cut off the current to the short circuit by breaking the contact between the power supplying net and the short circuit.

Figure 1:
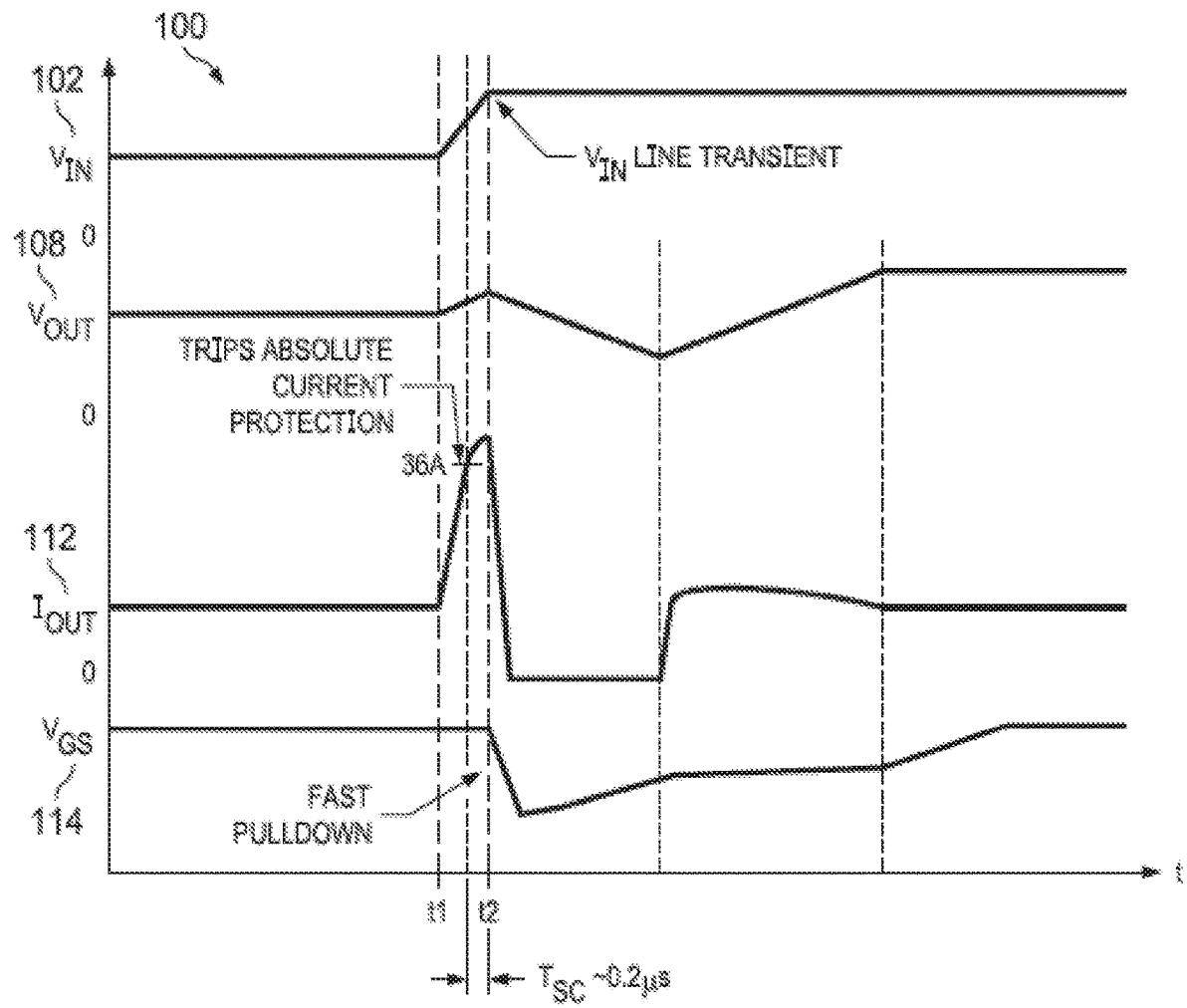
FIG. 1 is a timing diagram illustrating signals associated with operation of a protection device that is triggering short circuit protection.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located there between. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, the term "above" is used with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate. Likewise, as used herein, a first component is "below" another component when the first component is closer to the bulk region of the semiconductor substrate. As noted above, one component can be above or below another with other components therebetween or while being in direct contact with one another.

Modern electronic systems utilize multi-voltage power distribution to support various types of loads. Multi-voltage power distribution can utilize power paths for the various types of loads to provide power to each load from a common input supply. A power path includes electrical components such as capacitors, inductors, resistors, transistors, and/or different semiconductors to make up circuits that convert voltage from one level to another, protect the load and/or input supply from damaging currents, etc. A power path protection device is a circuit which provides power to a load while also regulating the amount of power the load is receiving in order to protect the load from transients, shorts in the circuit, etc. For example, a short circuit protection, also referred to as SCP, is a feature of power path protection devices. SCP in power path devices block power provided to the load in case the load current increases beyond its set short circuit threshold. For example, the manufacturer of the supply may provide a maximum current limit in which the supply source will be damaged at, and the power path device will implement the current limit value as a threshold value for the SCP to block power when the power path device detects the current has reached that threshold value.

In some examples, an SCP threshold value is scalable (e.g., the SCP threshold can be changed) to effectively protect the system based on a current limit value provided by the input supply and/or load manufacturer. Different systems may be rated for different current levels, resulting in the desire for the scalable SCP in a power path protection device. The power path protection device cuts off the current drawn by the load if the current exceeds the rated value, hence protecting each of such systems. For various types of loads, SCP levels are programmable or settable to an intended value. A power path protection device applies SCP by monitoring the current through a switch, wherein the current through the switch is indicative of load current. The switch is turned off (e.g., opened) when the current through the switch is greater than the threshold value specified by the user (e.g., manufacturer). Triggering SCP means turning off the switch when the current through the switch is greater than the threshold value specified by the user.

In some examples, when SCP is triggered due to an increase in current through the switch due to a supply transient, the result is undesirable. For example, a sudden change in the electrical device can cause a supply transient (e.g., a surge of high voltage for a certain period of time) due to the stored energy contained in any circuit inductances and/or capacitances. The size and duration of the transient depends on the value of the inductances, capacitances, and the supply voltage from a power source. Triggering the SCP due to a supply transient is undesirable because the current at the load has not met (e.g., exceeded) the rated threshold and, therefore, the load does not need to be disconnected from power. When an undesirable triggering of SCP occurs, there is an unwanted power supply interruption to the electrical system.

In some examples, supply transients occur from disconnecting and connecting a load from a system of loads. For example, a plurality of servers in a rack are connected to a power distribution unit (PDU), which distributes adequate power to each server in the rack. Servers are disconnected from the PDU and connected back to the PDU often, and this practice can result in supply transients due to the parasitic inductances in the supply path. When this practice interrupts an inductor's current, a surge voltage is generated based on the equation:

$$V = L \times di/dt \qquad \text{(Equation 1)}$$

wherein the surge voltage (V) is equal to inductance (L) multiplied by the change in current shutdown over time (di/dt). This surge voltage (V) causes the current through the power protection device to increase. If the current meets (e.g., exceeds) the threshold (e.g., set by the current limit), SCP may be triggered and therefore shut off the power to the remaining connected in servers of the rack. The surge voltage (V) may not damage the PDU or the servers and, therefore, shutting off the power to the servers results in user inconvenience, system down time, etc., none of which are desirable.

FIG. 1 illustrates a timing diagram 100 illustrating signals associated with operation of a protection device when an input voltage 102 provides a supply transient to a load via the protection device. The input voltage 102 increases at time t1, indicating a supply transient. At time t1, the output voltage 108 of the protection device increases, along with the output current 112. The output current 112 is shown as a spike, and the spike of current meets a threshold set by manufacturer at time t2. But the output current 112 increase is not due to a short, and therefore power should not be removed from the load due to the output current 112 spike.

The timing diagram 100 depicts the gate-to-source voltage (Vgs) 114 of a power MOSFET in that is in the protection device. The power MOSFET provides current to the load and is switched on and off depending on the state of the load. The Vgs 114 is pulled down at time t2, which is the total short-circuit response time after the output current 112 meets the threshold current of 36 amps. This is an undesirable trigger of short circuit protection, because the absolute current protection is not protecting the load from a short in the circuit, instead the absolute current protection is protecting the load from a supply transient, which lasts for a short period of time and does not damage the load. The output voltage 108 increasing and the output current 112 increasing indicates that there was a transient in the input voltage 102. Examples disclosed herein determine when the output voltage 108 is increasing and when the current to the load is increasing and further determines short circuit protection is not to be enabled or stopped from shutting off the power MOSFET, to avoid an undesirable result of cutting off power provided to the load.

Example methods and apparatus disclosed herein monitor the current through a switch of the power path as well as the input voltage or output voltage of the power path. Example methods and apparatus further determine, based on the monitored current and input/output voltage, if the input or output voltage is increasing or decreasing while the monitored current is increasing. Based on the result, example methods and apparatus disclosed herein enable scalable SCP or disable scalable SCP and enable a maximum SCP. For example, methods and apparatuses disclosed herein include an output voltage fall detector to determine if the voltage across the output of the switch is increasing or decreasing by sensing a high voltage signal at the output of the switch and converting the high signal to a low voltage logic signal for processing. The example methods and apparatus disclosed herein also include a current increase detector to determine if the output current of the switch is increasing. In some examples, the output voltage fall detector and the current increase detector are compared to determine if both the current is increasing and the output voltage is increasing and disabling scalable SCP while enabling maximum SCP.

Example methods and apparatus disclosed herein utilize the results between the comparison of the current increase detector and output voltage fall detector to differentiate between a supply transient event and a shorted load event. For example, when the current increase detector determines the current at the output of the switch is increasing and when the output voltage fall detector determine the output voltage at the switch is falling, then it is a shorted load event. When the current increase detector determines the output current is increasing and the output voltage fall detector determines the output voltage is not falling, then it is a supply transient event. These results are discussed in detail below in connection with FIGS. 1-9.

As used herein, the term power path refers to the power path protection device in which includes SCP as well as power converters, linear regulators, power muxes, fuses, load switches, etc. For example, the power path distributes power to a load(s) while also providing protection to the load.

As used herein, scalable short circuit protection (SCP) refers to the ability of the SCP threshold to change based on the users' needs. For example, a power path can service a load between a particular rating of load current, such as 1 amp to 5 amps, and depending on the user, the SCP of the power path device can be set to include a current threshold value from anywhere between 1 amp to 5 amps. In some examples, the user may define the steady state current they wish their load to operate at, in which case the SCP can be designed to have a certain percentage higher than the steady state current. For example, if the steady state current of a load is 2 amps and the SCP threshold is to be 50 percent higher than the steady state current of 2 amps, then current limit threshold is 3 amps.

As used herein, maximum short circuit protection (SCP) refers to maximum amount of current the power path provides to a load before load is damaged. For example, the load described above in which is operating at a steady state of 2 amps may be a 5 amp rated device, and for a certain amount of time can handle 7.5 amps without becoming damaged. In this manner, the maximum SCP threshold would be 7.5 amps.

As used herein, the term "steady state" refers to an equilibrium condition of a circuit that occurs when the effects of transients are no longer important. For example, a circuit is in steady state when the current at each point in the circuit is constant (e.g., does not change with time).

Figure 2A:
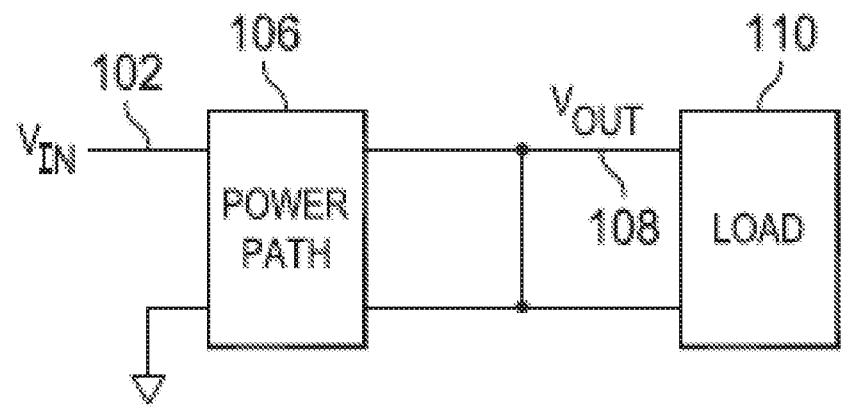
FIGS. 2A and 2B are block diagrams illustrating an example implementation of an example power path.
Figure 2B:
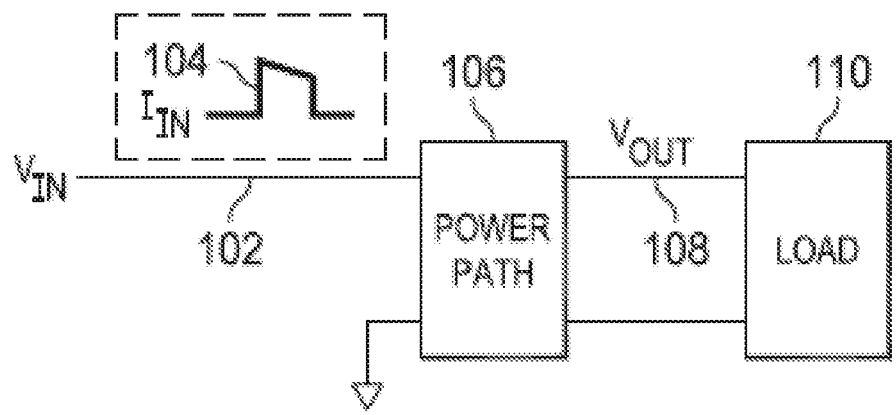
Figure 3:
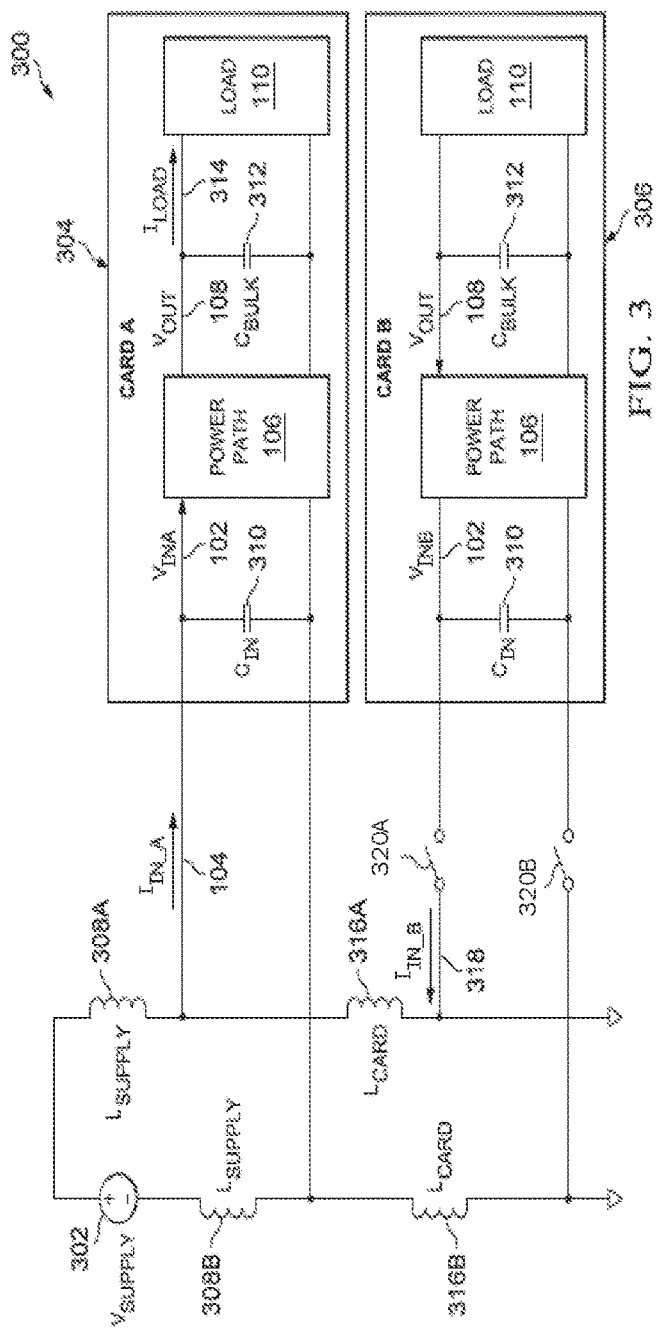
FIG. 3 is a block diagram illustrating an example power supply circuit to provide power to multiple loads.
Figure 4:
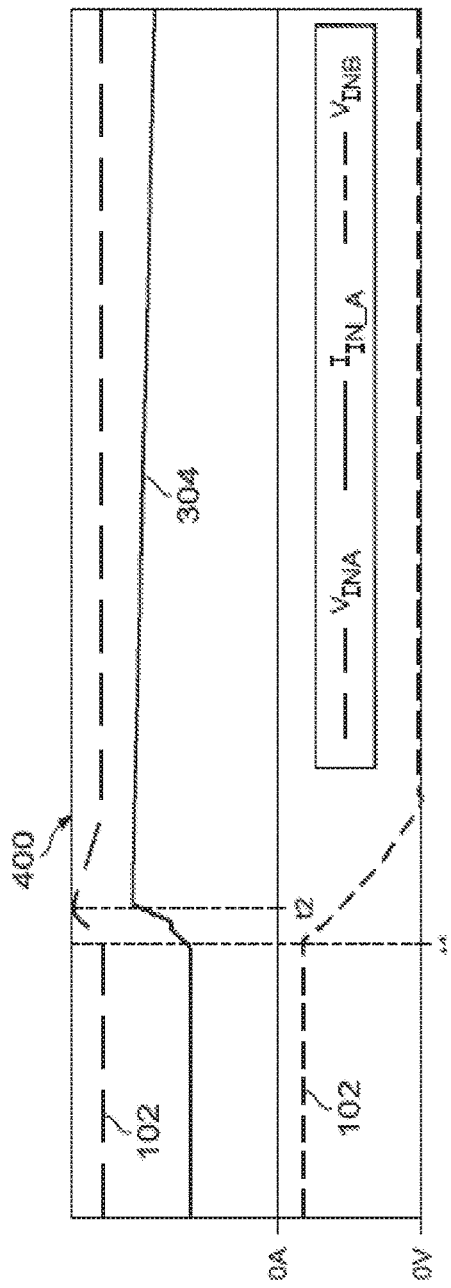
FIG. 4 is a signal plot illustrating a response of the example power supply circuit of FIG. 2 when one of the loads is removed.
Figure 5A:
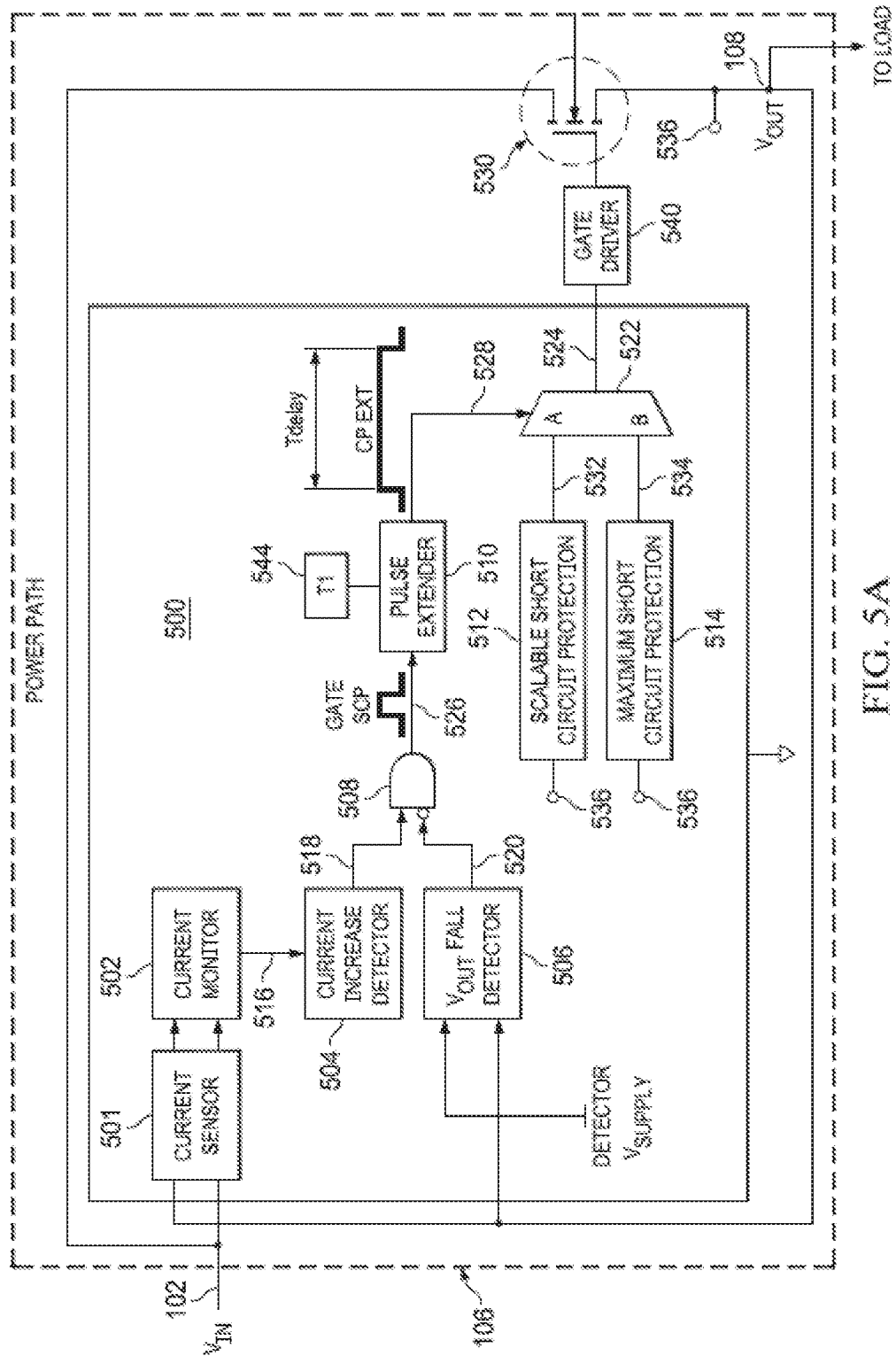
FIGS. 5A and 5B are block diagrams showing additional detail of example power paths of FIG. 2.
Figure 5B:
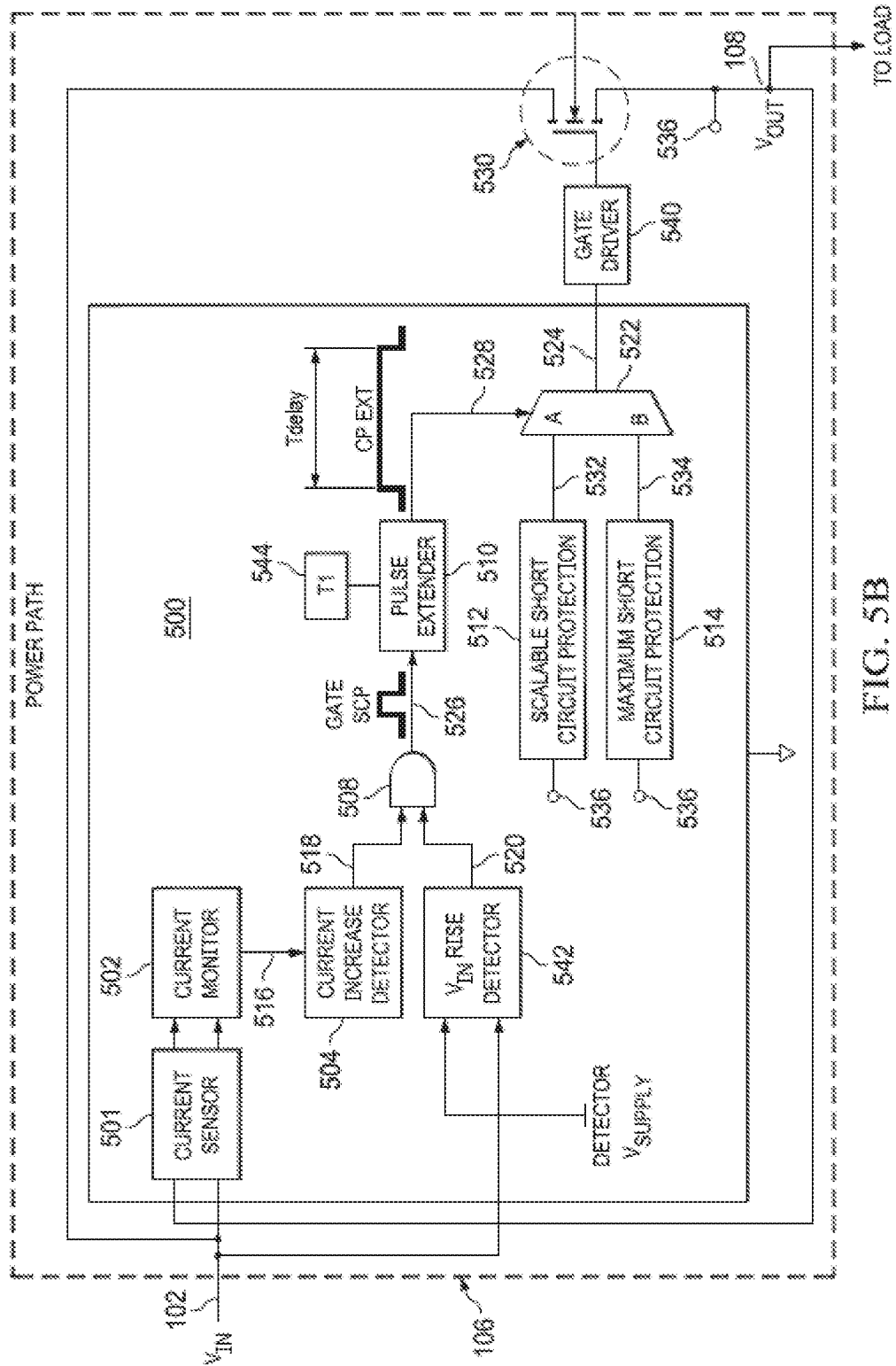

Turning to the figures, block diagrams of example power paths 106 for protecting a load 110 are illustrated in FIGS. 2A and 2B. The example of FIG. 2B illustrates a supply transient in which the response of the power path 106 is to not trigger SCP. The example of FIG. 2A illustrates the load 110 shorted to ground in which the response of the power path 106 is to trigger SCP. FIGS. 3 and 4 illustrate an example manner of implementing a plurality of power paths 106 for protecting multiple loads in one schematic. FIGS. 5A and 5B illustrate an example system 500 diagram to overcome the problems mentioned above in connection with undesirable triggering of SCP. FIGS. 2A and 2B are described in further detail below.

In FIG. 2A, an example input voltage (Vin) 102 is provided to the example power path 106 in which is distributed to the example load 110. The example power path 106 includes a plurality functions such as short circuit protection (SCP), voltage conversion (e.g., converting a high input voltage 102 to a low output voltage 108), and/or voltage regulation (e.g., regulating the amount of output voltage 108 provided to the load 110). The purpose of the example power path 106 is to provide a shut off mechanism (e.g., blocking the input voltage 102 from being provided to the load 110) to the example load 110 when the example load 110 is shorted to ground or when the example load 110 outputs a current greater than a threshold. For example, when the load 110 is shorted to ground, the voltage begins to decrease due to the lack of resistance between the load 110 and ground, therefore there is an excessive amount of current conducting through the load due to the low impedance. In some examples, the excessive amount of current can damage a supply providing the input voltage 102 and/or the power path 106. The block diagram of FIG. 2A illustrates the example load 110 shorted to ground. In this manner, SCP would be triggered and the input voltage 102 would be blocked by the example power path 106 in order to protect the supply providing the input voltage 102 and/or the power path 106 from becoming damaged.

In FIG. 2B, the example input current ($I_{IN}$) 104 is shown increasing for a short period of time, similar to a pulse. The input current 104 of FIG. 2B indicates a supply transient which may result in an increase of current conducting through the example load 110. Additionally or alternatively, during a supply transient, the input voltage 102 may also increase for a short period of time. In some examples, when the input current 104 is a transient, the current conducting across the load 110 increases beyond the threshold. In this manner, a previous power path determines the current conducting through the load 110 is increasing and therefore triggers SCP resulting in an unwanted interruption of supply current. It is undesirable to trigger SCP during a supply transient because the example load 110 is not malfunctioning and therefore there is an unwanted power supply interruption in the system. The example power path 106 of FIG. 2B does not trigger SCP when there is a supply transient.

FIG. 3 illustrates an example power supply circuit 300 in which multiple power paths 106 have a common power supply (Vsupply) 302. The example power supply circuit 300 includes the example power supply 302, an example card A 304, an example card B 306, an example input capacitor 310, the example power path 106, an example bulk capacitor 312, and the example load 110. The example power supply circuit 300 also includes inherent or parasitic inductances Lsupply 308 and Lcard 316 which are a result of the power conducting across connecting wires in the example power supply circuit 300. Lsupply 308A can be referred to as the distributed inductance across the example power supply circuit 300 from the example power supply 302 positive side and Lsupply 308B can be referred to as the distributed inductance on the negative power supply side (e.g., ground reference). Lcard 316A can be referred to as the parasitic inductance (e.g., an unwanted effect of routing electrical connections on a Printed Circuit Board) between the example card A 304 and the example card B on the positive power supply side, and Lcard 316B can be referred to as the parasitic inductance on the negative power supply side (e.g., ground reference).

In FIG. 3, the example power supply circuit 300 includes the example power supply 302 to supply power to the example card A 304 and the example card B 306. The example card A 304 represents a system as a whole, for example a server, wherein the server includes the power path 106 coupled to a motherboard (e.g., the load 110). The example card A 304 also includes components such as the example input capacitor 310 and the example bulk capacitor 312. In some examples, the input capacitor 310 is an electrical component in which provides filter characteristics for the example power path 106 such as decreasing ripple voltage, adjusting the incoming DC voltage, reducing the impedance imposed by the power supply 302, etc. In other examples, input capacitor 310 could be the parasitic capacitor depicted as lumped at the input of power path 106. The example card A 304 also includes the example bulk capacitor 312 that is intentionally coupled to the input of the example load 110 to provide further voltage ripple filtering (e.g., removing or reducing the variation in voltages).

In FIG. 3, the example card B 306 is a replica of the example card A 304, wherein the example card B 306 is coupled in parallel to the example card A and receives power from the example power supply 302. In some examples, card B 306 may be a server, different of the card A server but located in the same rack (e.g., a frame utilized to hold a plurality of servers, hard disk drives, modems, and other electrical equipment). The example input capacitor 310 of card B 306 may be provided to determine the input voltage Vinb 102 provided to the example power path 106. In other examples, the card B 306 may be different from card A 304 such as a different load 110 which may include different capacitor sizes and input voltages.

FIG. 4 is an example signal plot 400 depicting the input voltage Vina 102 of example card A 304, the input current Iin_a 304 of example card A 304, and the input voltage Vinb 102 of the example card B 306 when the example card B 306 is removed from the example power supply 302 of the example power supply circuit 300. Referring to FIG. 3, the example card B 306 is removed from the power supply 302 at time t1 and the disconnection is indicated by the open example first switch 320A and the open example second switch 320B. In some examples, when card B 306 is removed, the current flowing in card B 306, which is Iin_b 318, is diverted to other cards connected to the rack for example card A 304, resulting in a transient. Turning to FIG. 4, at time t1, example card B 306 is removed from the example power supply 302 and the card B 306 input voltage decreases to zero and the input current Iin_a 304 increases until time t2, wherein the increase in input current 304 is the transient. At time t2 the input current 304 decreases. This decrease in input current 304 indicates there is not a short in the load 110 of example card A 304, because if there was a short, the load current 314 and the input current 104 would remain at a high value until the load 110 was removed from the power supply 302.

The time between time t1 and time t2 is a short period (e.g., nanoseconds) in which the signals of the example signal plot 400 illustrates the transient (e.g., input current 304 increase) and input voltages of Vina 102 and Vinb 102 increase and decrease in voltage in response to the removal of example card B 306. For example, at time t1, Vina 102 increases until time t2, and then returns to the initial value (e.g., decreases as input current 304 decreases). Further, at time t1, Vinb 102 decreases due to the cut off of voltage from the example power supply 302.

In some examples, previous power paths such as fuses, regulators, etc., would have sensed the input current 304 transient and determined that there was too much current provided to the load 110, and therefore remove the voltage provided to the load 110. In this manner, there is an unwanted interrupt in supply voltage when there is no fault on the load 110. Examples illustrated in FIGS. 5A and 5B do not remove voltage provided to the load 110 during the input current 304 transient.

FIG. 5A illustrates the example system 500 diagram to determine if the current at the example load 110 is increasing and if the voltage at the load is decreasing to enable scalable SCP 512. In FIG. 5A, the example system 500 diagram determines if the current at the example load 110 is increasing and if the output voltage 108 at the example load 110 is increasing to enable maximum SCP 514. The example system 500 diagram is coupled to a power MOSFET (powerFET) 530 via a gate driver 540 and includes an example current sensor 501, an example current monitor 502, and example current increase detector 504, an example vout fall detector 506, an example logic gate 508, an example pulse extender 510, the example scalable SCP 512, the example maximum SCP 514, and an example multiplexer 522.

In FIG. 5A, the example system 500 diagram includes the example current sensor 501 to measure the current to the load. The example current sensor 501 is a two port network (e.g., two inputs Vin 102 and Vout 108 and two outputs) which includes a sense element. A sense element is any type of electronic component(s) that can be utilized to measure current across an output. For example, the sense element of the current sensor 501 may be a shunt resistor, a direct current resistance (DCR) circuit, a hall effect sensor, etc. The two outputs of the example current sensor 501 are coupled to the example current monitor 502 and provide a measurement of current to the example current monitor.

In 5A, the example system 500 diagram includes the example current monitor 502 to equalize the two outputs of the example current sensor 501 to determine the current provided to the example load 110 at the output voltage 108 node and to differentiate the voltage to determine if the voltage is negative or positive. The example current monitor 502 includes two inputs, and one output, 516 which is proportional to the current through the powerFET 530. The example current monitor 502 is coupled to the example current increase detector 504 to provide the output 518 which indicates if the current through the powerFET 530 is increasing or not. The example current monitor is described in further detail below in connection with FIG. 7. Alternatively, the example current monitor may be an amplifier, a resistor, a transistor, a current sensor, etc.

In FIG. 5A, the example system 500 diagram includes the example current increase detector 504 to determine when the current monitor output 516 is increasing or decreasing. For example, the current increase detector 504 includes a zero-crossing detector to determine when the differential of 516 cross the positive or negative threshold. The example current increase detector 504 generates a current detection signal, on a first output 518, to indicate when the current at the load 110 is increasing or decreasing. For example, the current increase detector 504 may output a digital 1 to indicate the current at the load 110 is increasing and a digital 0 to indicate the current at the load 110 is decreasing. The example current increase detector 504 is coupled to a non-inverting input of the example logic gate 508. The example current increase detector 504 is described in further detail below in connection with FIG. 7.

In FIG. 5A, the example system 500 diagram includes the example Vout fall detector 506 to determine if the output voltage 108 is falling (e.g., voltage is decreasing). For example, the Vout fall detector 506 senses the output voltage 108, which may be a high voltage (e.g., greater than the voltage which is used to do digital processing, or greater than 1-3 volts depending on semiconductor process used to realize the circuit) providing the power to a load and converts the high voltage to a low voltage domain (e.g., voltage which is used to do digital processing depending on semiconductor process used to realize the circuit) logic signal. The example Vout fall detector 506 includes a sensitivity great enough to detect small movement in output voltage 108, wherein sensitivity is defined as the minimum magnitude of an input signal (e.g., output voltage 108) required to produce a specified output signal (e.g., second output 520). For example, the input voltage Vina 102 illustrated in the example signal plot 400 of FIG. 4 depicts a voltage increase and the example output voltage fall detector 506 detects the voltage increase and outputs a logic 1 or logic 0 across the second output 520.

The example Vout fall detector 506 includes an example inverter 830 (FIG. 8) coupled to the second output 520. In some examples, when the Vout fall detector 506 detects the output voltage 108 is falling, the Vout fall detector 506 will output a logic 1 (e.g., a logic HIGH) at the second output 520. For example, when the output voltage 108 is falling (e.g., decreasing), the inverter 830 receives a logic 0 and inverters to a logic 1. The example Vout fall detector 506 is coupled to an inverting input pin of the example logic gate 508 via the example second output 520. In some examples, the second output 520 is inverted a second time by the logic gate 508. For example, when the inverter 830 outputs a logic 1, the inverting input of the logic gate 508 inverts the logic 1 to a logic 0. Additionally or alternatively, the logic gate 508 may not include an inverting input and instead include a second non-inverting input in which receives a digital signal from the second output 520. The example Vout fall detector 506 is described in further detail below in connection with FIG. 8.

In FIG. 5A, the system 500 diagram includes the example logic gate 508 to receive the two inputs (e.g., first output 518 and second output 520) and provide a single output (e.g., determining output 526) in which determines when SCP should be enabled or disabled. In some examples, the logic gate 508 is an AND gate in which outputs a logic 1 only when both the inputs are 1. For example, the logic gate 508 may output a 1 when the first output 518 is a logic 1 and the second output 520 is a logic 0, because the second output is coupled to the inverting input of the logic gate 508 in which inverts the logic 0 to a logic 1. In other examples, if the second output 520 is coupled to a second non-inverting input of the logic gate 508, the logic gate 508 would output a logic 1 when both the first output 518 and the second output 520 are a logic 1.

In some examples, a logic 1 at the determining output 526 determines to block scalable SCP 512. For example, when the current increase detector 504 determines the load current 314 is increasing, it outputs a logic 1, and when the Vout fall detector 506 determines the output voltage 108 is not decreasing, for example its steady or increasing, it outputs a logic 0 which is inverted to a logic 1 by the inverting input of the logic gate 508. If the load current 314 is increasing and the output voltage 108 is increasing, then a transient may have occurred in the power path 106. In some examples, a logic 0 at the determining output 526 determines to select scalable SCP 512. For example, when the current increase detector 504 determines the load 110 current is increasing, it outputs a logic 1, and when the vout fall detector 506 determines the output voltage 108 is decreasing, it outputs a logic 1 which is inverted to a logic 0 by the inverting input of the logic gate 508. If the load current 314 is increasing and the output voltage 108 is decreasing, then the load 110 shorted and scalable SCP 512 is selected to protect the supply 302 from harsh currents. Additionally or alternatively, the example logic gate 508 could be an OR gate, a NOR gate, a NAND gate, an XNOR gate, an XOR gate, etc., and the first input and second input of the logic gate 508 may be both inverting inputs, both non-inverting inputs, one inverting input and one non-inverting input, etc.

In FIG. 5A, the example system 500 diagram includes the example pulse extender 510 to apply an extension of time on the determining output 526 when it is HIGH (e.g., a logic 1). For example, the pulse extender 510 may cause the high pulse to last for a specified period of time set by an example timer T1 544. In some examples, the timer T1 544 is determined by the inherent parasitic inductances of Lsupply 308A in the supply path, the input capacitance of Cin 310, and/or the output capacitance of Cbulk 312 of FIG. 3. The period of extended time is dependent upon these components of the example power supply circuit 300 for the purpose of determining the amount of time it takes for the electrical energy stored in each component, during a transient, to return to a steady state after the transient. In this manner, the example pulse extender 510 ensures scalable SCP 512 is not enabled during a transient (e.g., to ensure power to the load 110 is not removed erroneously). For further understanding, the pulse extender 510 is included in this system 500 diagram because the example logic gate 508 may output a high signal for indication of a transient, but this high signal may be a short pulse, in which goes back low once the output voltage 108 begins to decrease. In this manner, the load current 314 may still be above the scalable SCP current threshold and thus, the scalable SCP 512 will try to remove power provided to the load 110 if the selecting input 528 selects the value on the scalable SCP output 532. In order to avoid this from occurring, the pulse extender 510 extends the pulse that indicates a transient (e.g., the logic 1) so that scalable SCP 512 is not selected. It is possible that the current to the load 110 is still shut off during this time if the maximum SCP 514 is enabled. For example, the sensing node 536 may sense the load current 314 to be above the maximum threshold current (e.g., maximum defined value) and therefore, when the selecting input 528 selects output 534 "B," it may forward a signal to the example gate driver 540 in which would lower the voltage at the gate terminal of the example powerFET 530 to remove the current provided to the load 110.

In some examples, the pulse extender 510 may be bypassed. For example, if the determining output 526 is LOW (e.g., logic 0), the pulse extender 510 may not extend this signal. The example pulse extender 510 is coupled to the example multiplexer 522 via the selecting input 528, wherein the selecting input 528 is the selector to the example multiplexer 522. The example pulse extender 510 may include a plurality of components that receive an input and produce a longer output than the input when the signal is HIGH. The example pulse extender 510 is described in further detail below in connection with the example multiplexer 522.

In FIG. 5A, the example system 500 diagram includes the example scalable short circuit protection (SCP) 512 to sense the load current 314 and determine when the load current 314 is beyond a threshold current determined by the user. For example, the scalable SCP 512 is a current limit set by the user to protect the load 110 from operating at a potentially damaging level. The scalable SCP 512 includes a sensing node 536 as an input in which is also coupled to the source terminal of the example powerFET 530. The example sensing node 536 senses the load current 314 and may provide the value to the scalable SCP 512 and the maximum SCP 514. In some examples, the value of current may be an analog number, a digital value, a signal, etc. and the SCP blocks 512, 514 receive the value and determine the output it should provide. For example, if the scalable SCP 512 is set to be enabled when the load current 314 is greater than or equal to 3 amps, and the sensing node 536 provides an analog value representing 3 amps, the scalable SCP 512 generates a logic 1 on output 532 to provide to the multiplexer 522. The logic 1 on output 532 is indicative of the value sent to the output 524 if output 532 (e.g., the upper input A of the example multiplexer 522) is selected by the selecting input 528.

In FIG. 5A, the example system 500 diagram includes the example maximum SCP 514 to sense the load current 314 and determine when the load current 314 is beyond the maximum current threshold of the example load 110. For example, the maximum SCP 514 receives a value from the sensing node 536 indicating the load current 314 and determines if the load current 314 is greater than or equal to the maximum threshold current. In some examples, if the maximum threshold current is 7 amps, and the sensing node 536 senses a value of 7 amps, the maximum SCP 514 generates a logic 1 on output 534 to provide to the multiplexer 522. The logic 1 on output 534 indicates the value sent to the output 524 if output 534 (e.g., the low input B of the example multiplexer 522) is selected by the selecting input 528.

In FIG. 5A, the example system 500 diagram includes the example multiplexer 522 to select one of two outputs 532, 534 and output an information signal, indicative of one of the two outputs 532, 534, on the output 524, wherein the output 524 is coupled to the example gate driver 540. For example, the multiplexer 522 includes a selecting input 528 (e.g., the selecting input 528 of the pulse extender 510), the scalable SCP output 532, and the maximum SCP output 534. The example scalable SCP output 532 is represented by the letter "A" and the example maximum SCP output 534 is represented by the letter "B." In some examples, "A" and "B" can be a digital value or an analog value and is determined by the scalable SCP 512 or maximum SCP 514. For example, "A" may be a logic 0 and "B" may be a logic 1, and the selecting input 528 may be either a logic 0 (e.g., selecting output 532 "A") or a logic 1 (e.g., selecting output 534 "B"). In this manner, the example multiplexer 522 forwards the logic 0 or logic 1 on outputs 532, 534 to the output 524 in which is coupled to the example gate driver 540. The example gate driver 540 controls the gate terminal of the example powerFET 530, thus controlling the current that is provided to the example load 110.

In some examples, when the determining output 526 of the logic gate 508 is a logic 0, the pulse extender 510 is not initiated and the logic 0 is provided as the selecting input 528 to the multiplexer 522 to select the output 532. For example, if the sensing node 536 senses a current above the threshold current for scalable SCP, then the scalable SCP 512 is enabled and the output 532 A is a 1, and if the current increase detector 504 detects an increase in current through the load 110 but the vout fall detector 506 detects the output voltage is falling (e.g., thus not increasing), then the selecting input 528 is a logic 0 and selects the output 532 A to forward to the output 524 in which the gate driver 540 further turns off the powerFET 530 by providing a low voltage signal to the gate terminal.

In some examples, when the determining output 526 of the logic gate 508 is a logic 1, the pulse extender 510 is initiated and the logic 1 signal is extended for a specified amount of time set by the pulse extender 510. Further, the logic high signal is provided to the selecting input 528 of the example multiplexer 522 to select output 534 "B." For example, the sensing node 536 senses a current above the threshold current for scalable SCP but does not sense a current above the maximum threshold current set by the maximum SCP 514, therefore maximum SCP is not enabled and a logic 0 is on "B" of the 434 output. Further, the example current increase detector 504 and the example vout fall detector 506 detect an increase in load current 314 and voltage on Vout 108, so the example logic gate 508 outputs a logic 1 which is extended (e.g., until the load current 314 and output voltage 108 decrease) to select the output of the maximum SCP "B" which is a logic 0, and the logic 0 is forwarded to the example gate driver 540 in which generates a high voltage to keep the powerFET 530 on.

Turning to FIG. 5B, the example system 500 diagram includes an example Vin rise detector 542 to replace the example vout fall detector 506 of FIG. 5A. The example Vin rise detector 542 determines when the input voltage 102 is rising in replacement of determining when the output voltage 108 is decreasing. The example Vin rise detector 542 receives the input voltage 102 as well as the detector voltage supply, wherein the input voltage 102 is being monitored and the detector voltage supply is providing adequate voltage to the circuit utilized to power the example Vin rise detector 542. In some examples, the current to the load 110 increasing and the input voltage 102 increasing is indicative of a supply transient. Therefore, the example system 500 diagram is to block scalable SCP 512 and enable maximum SCP 514 when the example current increase detector 504 detects the increasing output current and when the example Vin rise detector 542 detects the increasing input voltage 102.

In FIG. 5B, the example system 500 diagram includes the example logic gate 508 with two non-inverting input pins. The example logic gate 508 is an AND logic gate, and outputs a high when both of the inputs are high and further outputs a low when any of the two inputs are low. For example, when the current increase detector 504 outputs a high voltage on the first output 518 and when the Vin rise detector 542 outputs a high voltage on the second output 520, the logic gate 508 outputs a high voltage on the determining output 526. When the determining output 526 is high, the example pulse extender 510 extends the high voltage as a means to block scalable SCP 512, as described above in connection with FIG. 5A.

In other examples, when the example current increase detector 504 outputs a high voltage on the first output 518 and when the example Vin rise detector 542 outputs a low voltage on the second output 520, the example logic gate 508 outputs a low voltage on the determining output 526. In this manner, the example pulse extender 510 bypasses the low voltage and provides it directly to the example multiplexer 522 to select the scalable SCP output 532, as described above in connection with FIG. 5A.

The example system 500 diagram illustrated in FIG. 5B provides a similar functionality to the example power path 106 as the example system 500 diagram illustrated in FIG. 5A. For example, the system 500 diagram is to trigger scalable SCP 512 when the load 110 is a short in order to protect the example supply 302 from becoming damaged due to excessive current. The example system 500 diagram is also to block a trigger of scalable SCP 512, for a period of time, when the supply 302 generates a transient, and further enable a maximum SCP 514. The system 500 diagram of FIGS. 5A and 5B both provide such functionality as described.

Figure 6:
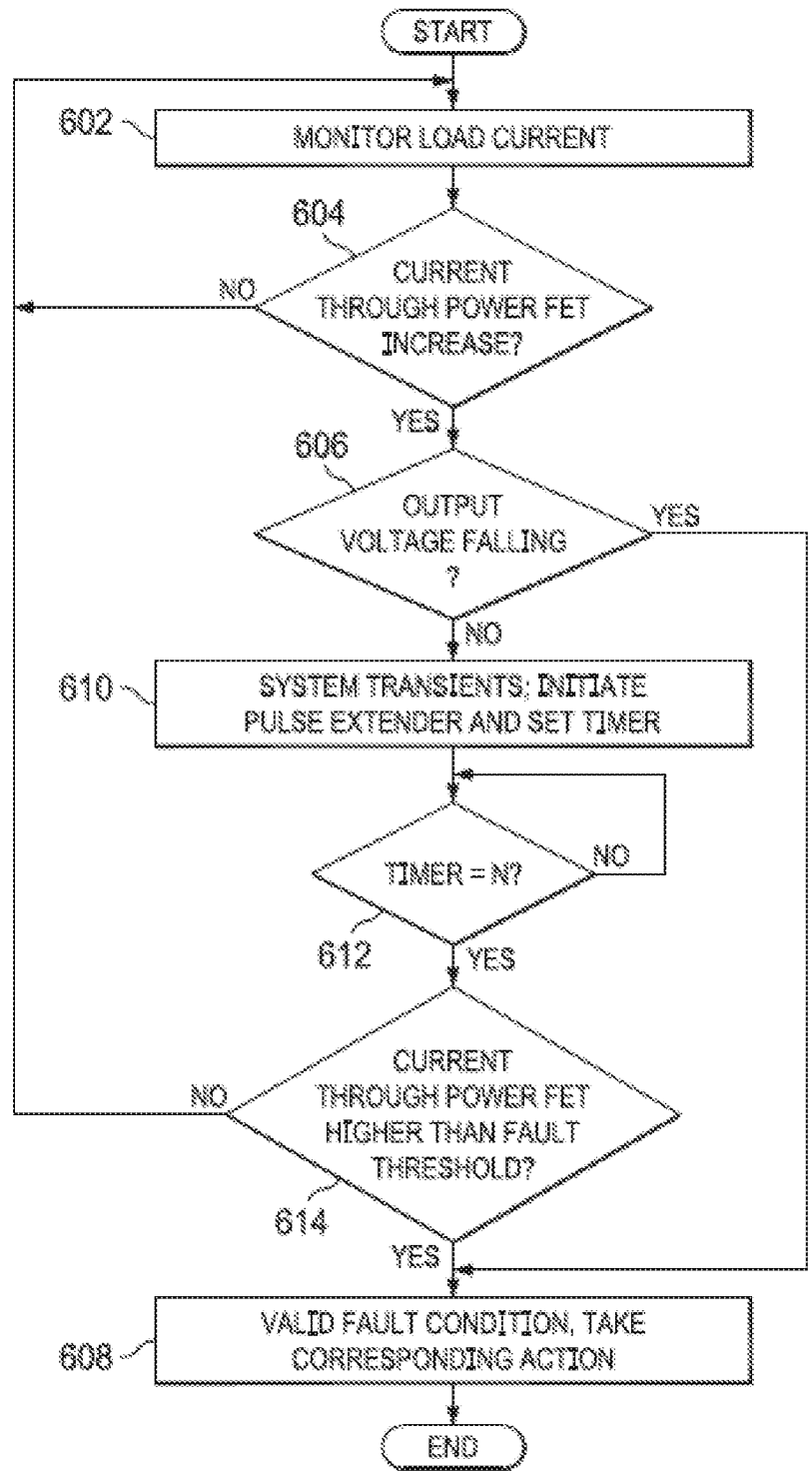
FIG. 6 is a flowchart representative of the functionality of the block diagrams of FIG. 5A.

A flowchart representative of the functionality of the example system 500 diagram of FIG. 5A is illustrated in FIG. 6. The power shut off program of FIG. 6 begins at block 602 at which the example system 500 diagram initiates the example current monitor 502 to monitor the current of the output current of the example powerFET 530. For example, the current monitor 502 receives the output voltage 108 and compares it to the input voltage 102 to provide a value to the example current increase detector 504. The example current increase detector 504 determines if the current through the powerFET 530 increased (block 604). For example, the current increase detector 504 receives the output of the current monitor 502 and compares it to a threshold current. If the current increase detector 504 determines that the current through the powerFET has not increased, the process returns to block 602. If the example current increase detector 504 determines that the current has increased, the process turns to block 606, wherein the example vout fall detector 506 determines if the output voltage 108 is falling. For example, the vout fall detector 506 monitors the output voltage 108 and detects when the output voltage 108 decreases.

Alternatively at block 606, a Vin rise detector may be utilized to indicate if the input voltage Vin 102 is rising. For example, if detecting when output voltage 108 is falling indicates that there is a supply transient at the input, then utilizing the Vin rise detector to determine when the input voltage Vin 102 increases also indicates when there is a supply transient at the input. In this manner, the condition of block 606 would not change, whether the example vout fall detector 506 is utilized or a Vin rise detector is utilized. Therefore, the control turns to block 608 or 610, as described below.

If the example vout fall detector 506 determines the output voltage 108 is decreasing (block 606), the example system 500 diagram determines the example load 110 has a valid fault and takes corresponding action (block 608). For example, the logic gate 508 outputs a logic 0 to the example multiplexer 522, wherein the logic 0 is the selector and selects to enable short circuit protection 512 as the corresponding action. If the example vout fall detector 506 determines the output voltage is not decreasing, the example system 500 diagram determines a transient has occurred and initiates the example pulse extender 510 and sets timer T1 544 (block 610). For example, the logic gate 508 outputs a logic 1 and provides it to the pulse extender 510, which extends the logic 1 signal for a specific amount of time n. The system 500 diagram determines if the timer T1 544 equals n (block 612). For example, the pulse extender 510 continues to output a logic 1 until the timer T1 544 equals n.

When the example pulse extender 510 determines the timer T1 544 equals n (block 612), the example system 500 diagram determines if the current through the example powerFET 530 is still higher than the fault threshold which can be the scalable SCP threshold (block 614). For example, after the pulse extender 510 extends the logic 1 for the specified amount of time n, the selecting input 528 will go to 0. Further, the example multiplexer 522 selects scalable SCP output 532, A. At this point if the load current 314 is still higher than the scalable SCP threshold, the scalable SCP output 532 will be 1 and output 524 will be 1, which forces the example gate driver 540 to shut off the powerFET 530. In this manner, the process turns to block 608, wherein the example system 500 diagram determines there is a valid fault condition and to take a corresponding action. If the example system 500 diagram does not determine that the current through the example powerFET 530 is not greater than the scalable SCP threshold current, then the process returns to block 602.

Figure 7:
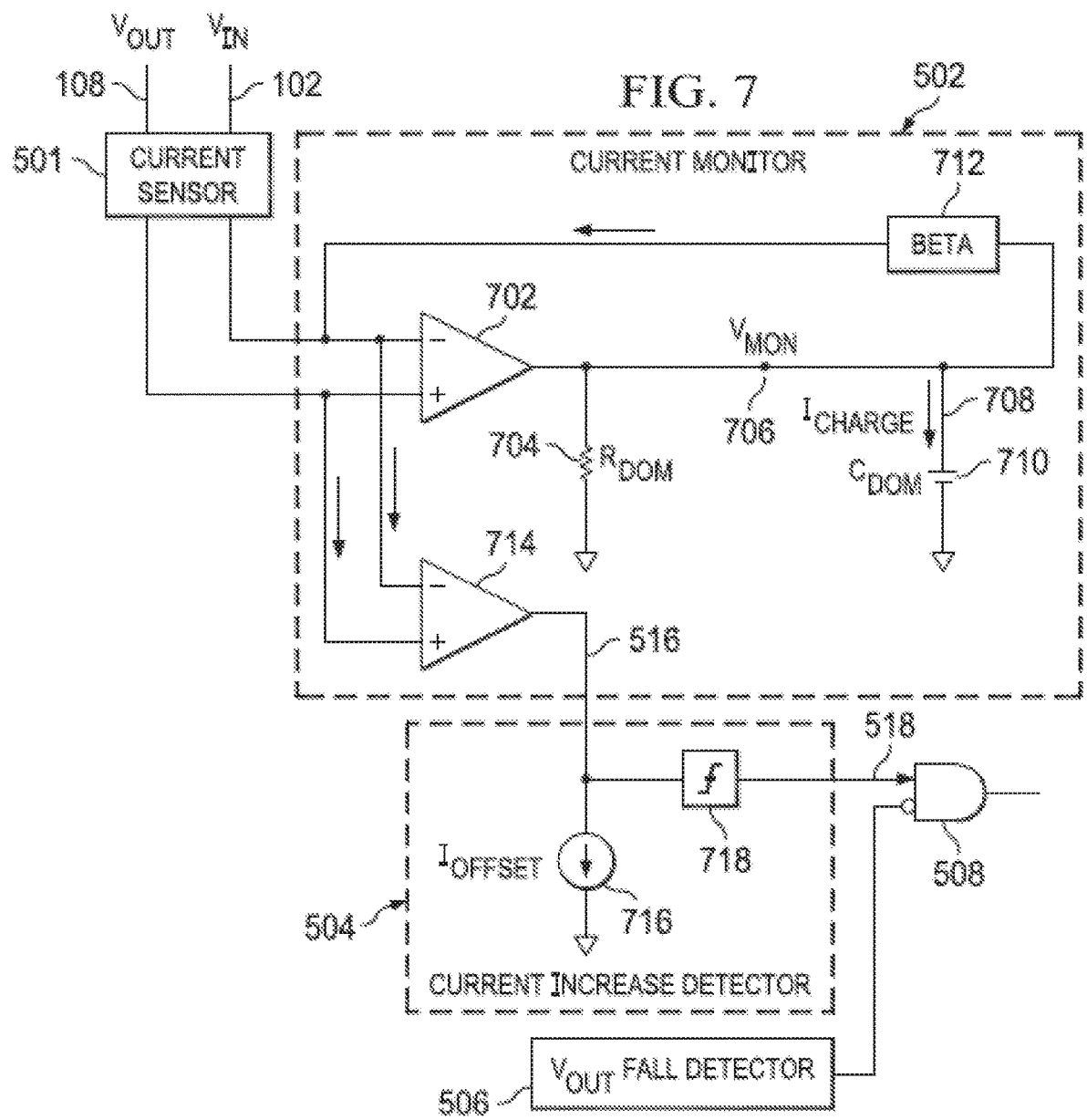
FIG. 7 is a schematic showing additional detail of an example implementation of the current increase detectors of FIGS. 5A and 5B.

FIG. 7 illustrates the example current monitor 502 in operation with the example current increase detector 504 to determine when the load current 314 is increasing. The example current monitor 502 includes an example first amplifier 702, an example resistor Rdom 704, an example capacitor Cdom 710, an example beta 712, and an example second amplifier 714. The example current increase detector 504 includes an example current offset Ioffset 716, and an example comparator 618.

In FIG. 7, the example current monitor 502 includes the example first amplifier 702 to differentiate the first output and the second output of the example current sensor 501 and output a current based on the differential input between the two voltages. For example, the first amplifier 702 is a transconductance amplifier which includes a non-inverting input and an inverting input, and the difference between the voltage at the non-inverting input and the voltage at the inverting input creates a current as the output. The current produced by the example first amplifier 702 may represent a differential current. The differential current is imposed across the resistor Rdom 704 and capacitor Cdom 710 which generates a monitored voltage Vmon 706. A capacitor is a two terminal component in which stores electrical energy when a positive and/or increasing voltage is applied to one of the two terminals and then discharges the electrical energy. The example capacitor Cdom 710 opposes a change in voltage (e.g., monitored voltage Vmon 706) and the current to voltage relationship of a capacitor is:

$$Icharge = C \times \frac{dV}{dt} \qquad \text{(Equation 2)}$$

The variable Icharge 708 indicates the current through the capacitor, the variable C is the capacitance (e.g., farads) of the capacitor Cdom 710, and the variables dV/dt indicate the rate of change of voltage Vmon 706. If the value of Icharge 708 is positive, the differential current is increasing, if the value of Icharge 708 is negative, the differential current is decreasing. Therefore, if the load current 314 is increasing, the monitored voltage Vmon 706 will increase which charges the capacitor Cdom 710, and the charged capacitor Cdom 710 provides the voltage back to the inverting input pin of the example first amplifier 702 via the example beta 712.

In FIG. 6, the example current monitor 502 is provided with the example beta 712 to be a feedback factor of the closed loop of the example current monitor 502. For example, beta 712 is the portion of the output that is provided to the input of the first amplifier 702. In some examples, beta 712 may include two resistors to form a voltage divider, a capacitor and an inductor to form a filter, etc. The example beta 712 determines the amount of monitored voltage 706 that is provided to the inverting input of the example first amplifier 702. In some examples, beta 712 determines the amount of monitored voltage 706 that is provided to the second amplifier 714. The analog feedback loop that includes the example first amplifier 702 and the example beta 712 is utilized to equalize the two outputs of the example current sensor 501 to realize the current sensing through the example current sensor 501.

In FIG. 7, the example current monitor 502 includes the example second amplifier 714 which is a replication of the example first amplifier 702 to replicate the differential current from the example first amplifier 702. The replicated current is provided to the example current increase detector 504 via the current monitor output 516. In some examples, the second amplifier 714 is a transconductance amplifier which receives two input voltages (e.g., input voltage 102 and monitored voltage 706) and generates an output current on the current monitor output 516. The example second amplifier 714 generates a current in which represents whether the load current 314 is increasing or decreasing.

In FIG. 6, the example current increase detector 504 includes the example comparator 618 to determine when output current of the example second amplifier 714 increases beyond Ioffset current 716. In some examples, the comparator 718 is an analog comparator in which compares two input currents (716, 716) and outputs a digital signal indicating which is larger. For example, the output of the analog comparator 718 is a binary digital output and will output a logic 1 if the current on 516 is greater than the Ioffset current 716, or a logic 0 if the current on 516 is less than the Ioffset current 716. In some examples, Ioffset current 716 should be zero to detect when the current on 516 is positive, however, Ioffset current 716 is set to a minimum value so as to take care of non-idealities like mismatch. Therefore, if the example second amplifier 714 provides an output of current in which is greater than the Ioffset current 716, the example comparator 718 will output a logic 1 to the example logic gate 508 via the first output 518. In this manner, the example logic gate 508 operates as described in detail above in connection with FIGS. 5A and 5B.

While an example manner of implementing the current monitor 502 and current increase detector 504 of FIGS. 5A and 5B is illustrated in FIG. 7, one or more of the elements, processes and/or devices illustrated in FIG. 7 may be combined, divided, re-arranged, omitted, eliminated and/or implemented in any other way. Further, the example first amplifier 702, the example beta 712, the example second amplifier 714, the example comparator 618, and/or, more generally, the example current monitor 502 and current increase detector 504 of FIGS. 5A and 5B may be implemented by hardware, software, firmware and/or any combination of hardware, software and/or firmware. Thus, for example, any of the example first amplifier 702, the example beta 712, the example second amplifier 714, the example comparator 618 and/or, more generally, the example current monitor 502 and current increase detector 504 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first amplifier 702, the example beta 712, the example second amplifier 714, and/or the example comparator 718 is/are hereby expressly defined to include a non-transitory computer readable storage device or storage disk such as a memory, a digital versatile disk (DVD), a compact disk (CD), a Blu-ray disk, etc. including the software and/or firmware. Further still, the example current monitor 502 and current increase detector 504 of FIG. 4 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
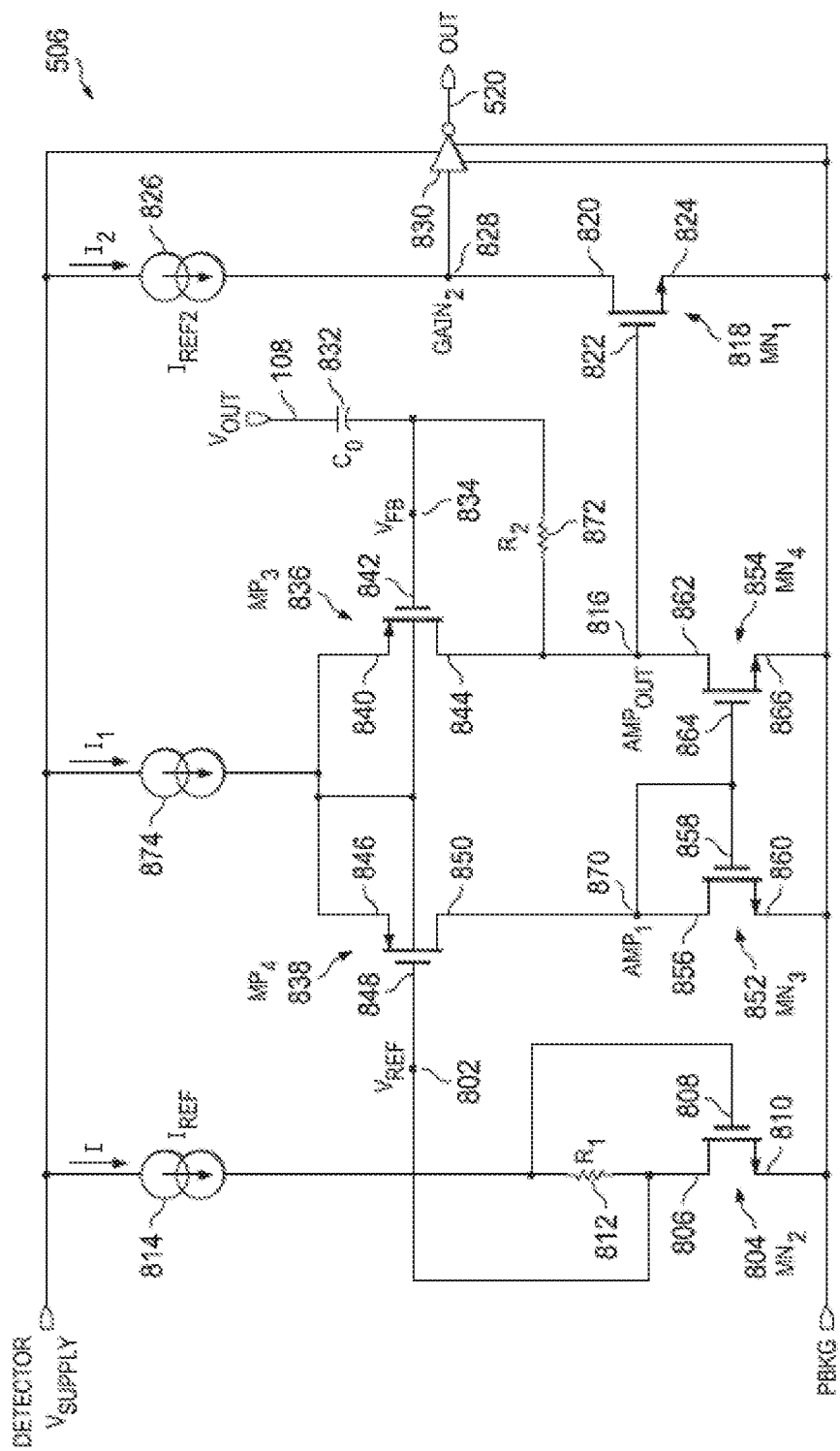
FIG. 8 is a schematic showing additional detail of an example implementation of the output voltage fall detector of FIG. 5A.

FIG. 8 is an example schematic depicting the example vout fall detector 506 of FIG. 5A. The example vout fall detector 506 includes a detector voltage supply (e.g., a low voltage supply different from Vin 102 to enable faster response time and lower area and quiescent current), the output voltage 108, the second output 520 of vout fall detector circuit 406 to the example logic gate 508, and a reference to ground. The example schematic of the vout fall detector 506 also includes a plurality of transistors, a capacitor C0 832, an example inverter 830, an example first resistor 812, and an example second resistor 872. In some examples, the output voltage 108 is the control voltage because the output voltage 108 initiates the example schematic to leave a steady state of operation or enter a steady state of operation.

In FIG. 8, the example schematic includes a plurality of transistors 804, 818, 852, 854 which are N-channel metal oxide semiconductor field effect transistors (NMOSFET). Alternatively, the transistors 804, 818, 852, 854 may be P-Channel MOSFETs, PNP BJTs, NPN BJTs, etc. Alternatively, the transistors 804, 818, 852, 854 may be a switch or any other type of power switching device. In FIG. 8, the example first transistor 804 includes an example first drain terminal 806, an example first gate terminal 808, and an example first source terminal 810. The example first transistor 804 is biased by a reference current source (IREF) 814. The example schematic includes IREF 814 to provide a fixed current to MN2 804 that is independent of the detector Vsupply voltage. The example first transistor 804 is in diode connection configuration along with an example resistor R1 812, wherein the first gate terminal 808 is coupled to the first drain terminal 806 via the example resistor R1 812. The example R1 812 is coupled to IREF 814 and the first drain terminal 806. In this manner, a diode connected voltage is developed at the first gate terminal 808 of the example first transistor 804 and a voltage equal to the current of IREF 814 times the value of the example resistor R1 812 will drop across the example resistor R1 812. Further, the voltage drop across the example resistor R1 812 results in a reference voltage of node VREF 802 to be equal to diode connected voltage minus IREF 814 times R1 812. The example first drain terminal 806 is coupled to a fourth gate terminal 848 of an example fourth transistor (MP4) 838 at node VREF 802.

In FIG. 8, the example schematic includes the example second transistor 818 (MN1 818). The example MN1 818 includes a second drain terminal 820, a second gate terminal 822, and a second source terminal 824. The second drain terminal 820 is coupled to a second reference current source (IREF2) 726 at a GAIN2 node 828. In some examples, IREF2 826 generates an equal amount of fixed current as IREF 814. The second source terminal 824 is coupled to ground, and the second gate terminal 822 is coupled to a sixth drain terminal 862 of a sixth transistor (MN4) 854 at node AMPOUT 816. In some examples, the MN1 804 is of the same size as MN2 804 (e.g., the two transistors have the same width to length (W/L) ratio of their respective gate terminals). In other examples, if IREF2 826 is not the same as IREF 814, then MN1 818 may be of a different size relative to MN2 804, wherein the W/L ratio of MN1 818 is proportional to the W/L ratio of MN2 804. For example, if IREF2 826 is to generate 1 amp more than IREF 814, the ratio between the two current sources is 2:1. In this manner, the W/L ratio of the two transistors 804 and 818 must also be 2:1, wherein MN2 804 includes a width and length that is 1 micron less than the width and length of MN1 818.

In FIG. 8, the example schematic includes the example transistors 838, 836, 852, and 854 which may form an amplifier with an example current source I1 874 providing the biasing current. For example, a third transistor (MP3) 836 and the MP4 838 are the inputs of the amplifier, and the sixth drain terminal 862 of MN4 854 is the output of the amplifier. The example MP3 836 includes an example third source terminal 840, an example third gate terminal 842, and an example third drain terminal 844. The third source terminal 840 is coupled to I1 874, the third gate terminal is coupled to a capacitor C0 832 at a node VFB 834, and the third drain terminal 844 is coupled to the sixth drain terminal 862 at node AMPOUT 816 and coupled to an example second resistor R2 872. The resistor R2 872 is also coupled to the capacitor C0 832. The third gate terminal 842 is one of the two inputs that receives a voltage from the capacitor C0 832 via the node VFB 834.

The example MP4 838 includes a fourth source terminal 746 coupled to the I1 874, the fourth gate terminal 848 coupled to the first drain terminal of MN2 804 at node VREF 802, and a fourth drain terminal 750 coupled to a fifth drain terminal 856 of a fifth transistor (MN3) 852 at an amp1 node 870. The fourth gate terminal 848 is one of the two inputs, different from the third gate terminal 842 input, that receives a voltage from the MN2 804 at node VREF 802.

In FIG. 8, MN1 818 is coupled to the output of the amplifier (e.g., node AMPOUT 816) that is formed by MP3 836, MP4 838, MN3 852, and MN4 854. The output of the amplifier, node AMPOUT 816, is fed back to the input of the amplifier at node VFB 834 through the resistor R2 872. The amplifier connected with the feedback resistor R2 872 forms a unity gain. A unity gain is a buffer that has a gain of 1, which means the output voltage is equal to the input voltage.

In some examples, this unity gain is utilized because some amplifiers (e.g., operational amplifiers) have a high input impedance and a low output impedance, and the unity gain formed by the output of the amplifier with the R2 872 maintains the input voltage at the output because of the impedance generated by the resistor R2.

In FIG. 8, the example capacitor C0 832 is a two terminal electrical component which stores potential energy in an electric field. The example capacitor includes a first capacitor terminal and a second capacitor terminal, the first capacitor terminal coupled to the output voltage 108 and the second capacitor terminal is coupled to the second resistor R2 872 and the third gate terminal 842. The capacitor C0 832 is coupled in parallel with the feedback resistor R2 872. In this manner, the capacitor C0 832 along with the amplifier, (e.g., the transistor MP3, MP4, MN3, and MN4) connected as a unity gain through resistor feedback R2 872, forms a high pass filter. A high pass filter utilizes a capacitor to receive an input signal (e.g., output voltage 108) and pass through the high frequency signals but block the low frequency signals.

In an example steady state operation of the vout fall detector 506, the signal on the Vout node 108 is constant (e.g., the voltage is not changing with respect to time). In the steady state operation, the voltage at node VREF 802 is equal to the voltage on node VFB 834, and I1 874 is split between the two transistors MP3 836 and MP4 838 because the gate-to-source voltage of a transistor determines the amount of current that will conduct through it. For example, the current conducting through the third drain terminal 844 is half of I1 874 and current conducting through the fourth drain terminal 850 is half of I1 874. When I1 874 conducts through the fourth drain terminal 850, the current is provided to the drain terminal fifth transistor MN3 856. The drain terminal 856 and gate terminal 858 of MN3 852 are shorted together at Amp1 node 870. In this manner, as the current conducting through MP4 838 is flowing to the drain terminal 856 of MN3 852, the transistor MN3 852 may modulate the voltage at the gate terminal 858 to accept the current provided by MP4 838. For example, due to the channel characteristics and size of MN3 852 as well as the short between the drain and gate terminal, the transistor MN3 852 will generate a voltage that is great enough to accept the current of MP4 838. Gate terminals of transistors have high impedance. Therefore, the current at the fifth gate terminal 858 is essentially zero amps, and all the amperes are conducting into the fifth drain terminal 856.

In some examples, MN4 854 is of the same size as MN3 852. Therefore, the gate to source voltage of MN4 854 is the same as the gate-to-source voltage of MN3 852. In this manner, the drain terminal 862 of MN4 854 accepts the same amount of current that the drain terminal of MN3 852 accepted.

Further, in the steady state operation, the voltage at node VREF 802 is equal to the voltage at the node AMPOUT 816. The equation 3 determines the voltage at the node VREF 802:

$$V\text{ref} = V gs_{(MN2)} - (R1 \times I\text{ref}) \quad \text{(Equation 3)}$$

The variable VREF corresponds to the voltage value at node 802, the variable Vgs(mn2) corresponding to the voltage across the first gate terminal 808 to the first source terminal 810, the variable R1 corresponds to the resistance (ohms) of the first resistor 812, and the variable IREF corresponds to the current conducting at reference current source 814. In this manner, the voltage value at node 802 is the gate-to-source voltage of the first transistor 804 minus the voltage drop across the first resistor 812. The voltage drop across any resistor is proportional to the current passing through its resistive value.

In this manner, since the voltage at node VREF 802 is equal to the voltage at the node AMPOUT 816 during steady state operation (e.g., when Vout node 108 is constant with respect to time), the gate-to-source voltage of MN1 818 is equal to the voltage at node VREF 802. For example, the voltage at the node AMPOUT 816 is coupled to the second gate terminal 822 of MN1 818. The second source terminal 824 of MN1 818 is coupled to the reference to ground (e.g., 0 volts). Therefore, the gate-to-source voltage of MN1 818 is the value of voltage at the node AMPOUT 816, when the vout fall detector 506 is operating is steady state mode.

In FIG. 8, because example MN1 818 is of the same size as example MN2 804, example MN1 818 conducts less current than the first transistor 804 conducts. For example, the MN2 804 conducts IREF 814 when the voltage across the first gate terminal 808 is greater than the voltage across the first source terminal 810. Further, the MN1 818 receives a voltage at the second gate terminal 822 that equals the voltage at the node VREF 802. The voltage at the node VREF 802 is less than the gate-to-source voltage of the MN2 804 (e.g., refer to Equation 3), therefore, the gate-to-source voltage of the second transistor 818 is less than the gate-to-source voltage of the first transistor 804. In this manner, the drain current of MN1 818 is lower than the drain current of MN2 804. As described above, IREF2 826 is related to IREF 814. For example, IREF2 826 can be equal to IREF 814. Therefore, IREF2 826 is greater than the drain current drawn by MN1 818. This makes GAIN2 node 828 go to high and the circuit output 520 is low. In a transistor (e.g., MOSFET, BJT, etc.), the current conducting through the transistor is proportional to the square of the fixed gate-to-source voltage. In some examples, this means that the greater the gate voltage, the greater the amount of current conducting through the transistor (e.g., for an N-Channel MOSFET).

In some examples, the IREF 814 conducts a different amount of current than IREF2 826 conducts. In some examples, the value of IREF2 826 can be a fixed ratio of the current IREF 814 and the width by length of the example MN1 818 is of the same ratio as the example MN2 808. When the current conducting through the second drain terminal 820 is less than the value of current at IREF2 826, the voltage at the GAIN2 node 828 increases to match the detector vsupply voltage (e.g., goes high). The node GAIN2 828 voltage is high because current of IREF2 826 is charging the GAIN2 828 node and that current is not shorted to ground by the example second transistor 818 due to the example MN1 818 being able to conduct a lower current as the Vgs of MN1 818 is less than Vgs of MN2 804. In some examples, the output voltage 108 falls and the capacitor C0 832 acts to maintain the change in voltage. For example, if the output voltage 108 decreases from 12 volts to 11 volts, the voltage on the node VFB 834, which was 1 volts, decreases to zero volts and the capacitor C0 832 maintains the original voltage drop (e.g., the voltage drop of 11 volts, from 12 volts at Vout 108 and one volt at VFB 834 from the node VREF 802), thus causing the voltage decrease at the node VFB 834. When the voltage decreases to zero volts at the node VFB 834, the example MP3 836 provides an increasing current to the node AMPOUT 816. For example, the third gate terminal 842 receives zero volts therefore increasing the current conducting through MP3 842 due to its P-channel characteristics. In this manner, the voltage at the example third gate terminal 842 is lower than the voltage at the example fourth gate terminal 848 (e.g., voltage at node VREF 802), therefore the example MP3 836 is conducting more current than the example MP4 838. When the example MP3 836 is on and current is conducting through the third drain terminal 844, the node AMPOUT 816 charges (e.g., increases to a higher voltage).

In some examples, when Vout 108 decreases, the voltage value at the node AMPOUT 816 is a different value than the voltage at the node VREF 802. The voltage value at the node AMPOUT 816 increases when Vout 108 decreases, and the increasing voltage of the node AMPOUT 816 is provided to the example second gate terminal 822 of example MN1 818. In some examples, the presence of the increasing voltage at the second gate terminal 822 turns on MN1 818, and the current of IREF2 826 conducts through the second drain terminal 820 to the second source terminal 824 to the ground reference. In this manner, the voltage at the example GAIN2 node 828 decreases (e.g., goes low) due to the current from MN1 818 being greater than IREF2 826. For example, the GAIN2 node 828 goes low, the low voltage is provided to the inverter 830 which inverts the low signal to a high signal (e.g., logic 1) and outputs the high signal to the logic gate 508 via the second output 520. The logic 1 provided to the example logic gate 508 indicates that the output voltage 108 is falling.

In FIG. 8, R1 812 has been added to manage non-idealities in devices. For example, transistor MN2 804 and transistor MN1 818 are designed to be of same type and have same width and length. But after manufacturing they will still have some mismatch between their width, lengths and other electrical characteristics. Similarly MP4 838 and MP3 836, MN3 852 and MN4 854 will have mismatches leading to the amplifier having a finite input referred offset (e.g., an amplifier having mismatch can be defined as the voltage which when applied at the input of the amplifier restores the output to the same value as that of an intended amplifier). Also the current sources IREF 814 and IREF2 826 will have mismatches. Due to all of the non-idealities, if R1 812 is not added, the voltage applied to the second gate terminal 822 of MN1 818 can be greater than described, leading to drawing current greater than IREF2 826. Therefore, GAIN2 node 828 will be low and the second output 520 will erroneously be provided with a high, even during steady state.

In some examples, the schematic of FIG. 8 may detect an increase in output voltage 108 by rearranging, removing, and/or adding transistors, logic gates, and other electrical components. In some examples, the second output 520 may indicate that the output voltage 108 is increasing by providing a logic 1 to the example logic gate 508 or that the output is decreasing by providing a logic 0 to the example logic gate 508 via the second output 520.

Figure 9:
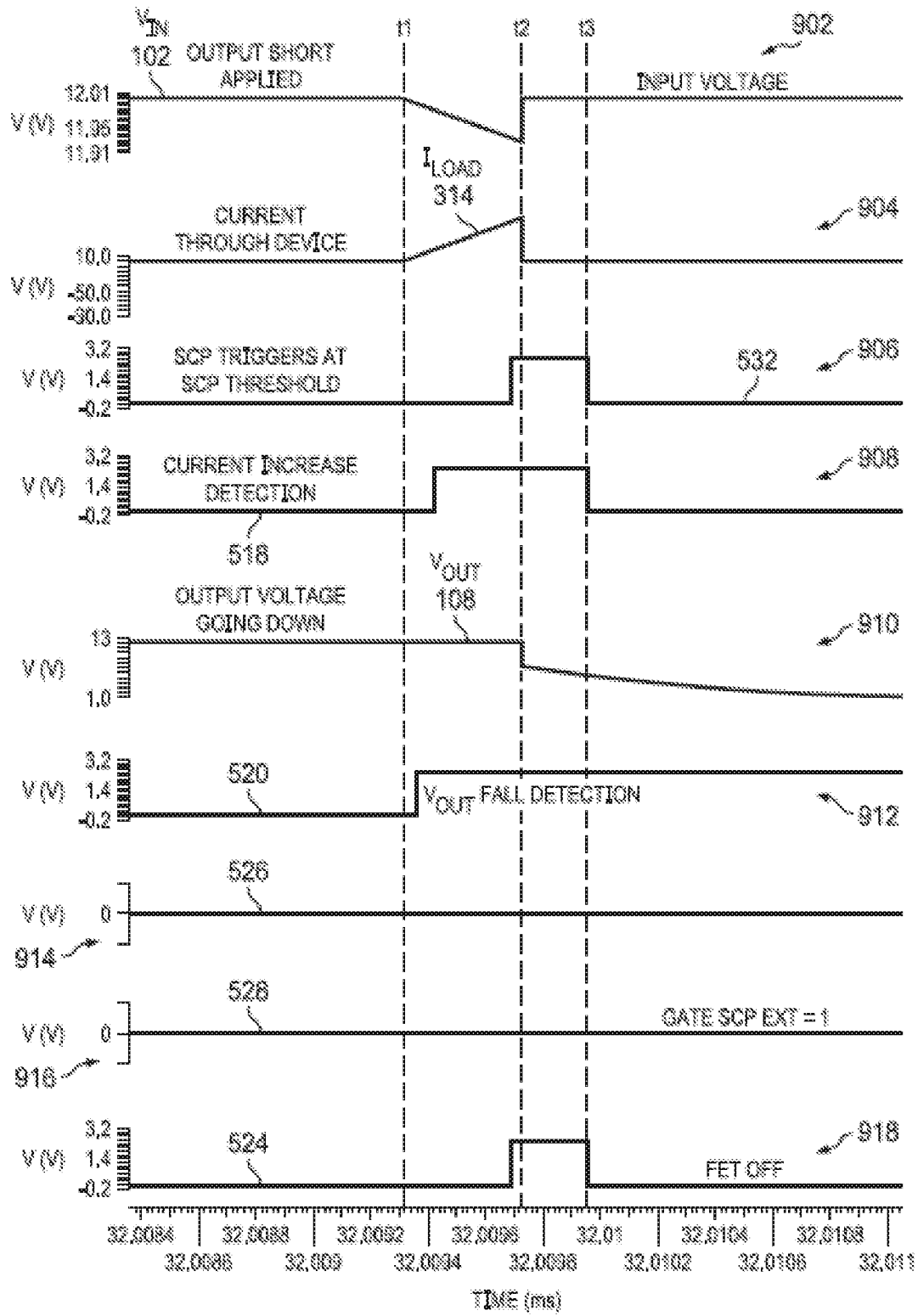
FIG. 9 is signal plot illustrating a response of the elements of the example block diagram of FIG. 5A when a short circuit occurs.

FIG. 9 illustrates an example timing diagram 900 depicting the response of the example system 500 diagram when a short occurs at the example load 110. The example timing diagram 900 includes signals corresponding to currents and voltages of inputs and outputs of the example system 500 diagram. The example timing diagram 900 includes an example second graph 902, an example third graph 904, an example fourth graph 906, an example fifth graph 908, an example sixth graph 910, an example seventh graph 912, an example eighth graph 914, an example ninth graph 916, and an example tenth graph 918.

In the example second graph 902, input voltage 102 signal decreases at time t1. In some examples, the input voltage 102 may be decreasing due to a short in the load 110, because the load 110 may be drawing higher current due to a short and Vin 102 can decrease due to finite impedance of the source. The input voltage 102 decreases from a steady 12 volts to 11.9 volts (e.g., 100 millivolts). In the example third graph 904, the current Iload 314 increases from time t1 (e.g., approximately 10 amps) to a time t2 (e.g., approximately 90 amps). The time in nanoseconds between t1 and t2 is 40 nanoseconds. For example, the current Iload 314 may be increasing due to the short in the load 110.

In the example fourth graph 906, scalable short circuit protection 512 is triggered when the current Iload 314 reaches the threshold current set by the user and the scalable SCP output 532 goes high. In the example fourth graph 906, the scalable SCP output 532 goes high at a time before t2. In the example fifth graph 908, the example current increase detector 504 outputs a high on the example first output 518 in response to the current Iload 314 increasing. In the example sixth graph 910, the output voltage 108 is decreasing. The output voltage 108 begins to decrease at time t1 (e.g. due to a short at the output load 110), and further drops at time t2 (e.g. due to the powerFET 530 shutting off and stopping the current supply to the load 110). For example, sixth graph 910 is not a high resolution scale, and therefore the decrease in output voltage 108 is not seen at time t1.

When the output voltage 108 begins to decrease, the example vout fall detector 506 outputs a logic 1 on the example second output 520, illustrated in the example seventh graph 912. Now, the example timing diagram 900 illustrates that the current through the example load 110 is increasing and the output voltage 108 is falling, and in response, the example current increase detector 504 outputs a high on the first output 518 and the example vout fall detector 506 outputs a high on the second output 520 indicating a decrease in output voltage 108. In this manner, the example eighth graph 914 illustrates the determining output 526 of the example logic gate 508, which is zero volts. The example logic gate 508 outputs zero volts because the second output 520 is inverted at the example logic gate 508. The example ninth graph 916 illustrates the output of the example pulse extender 510 which is the selecting input 528. The selecting input 528 is depicted as zero volts, which is provided to the example multiplexer 522.

The example multiplexer 522 receives the selecting input 528 of zero volts and selects the value of the output 532 of the scalable SCP 512, which is high. The example tenth graph 918 depicts the output 524 of the example multiplexer 522 which mirrors the example signal on output 532, wherein at time t2, the signal on output 532 goes high, so does the output 524 of the multiplexer. The high signal on 424 is provided to the example gate driver 540 which turns off the example powerFET 530 until time t3. At time t3, the example first output 518 goes low (e.g., indicated in fourth graph 906) indicating there is no longer an increase in load current 314. As the load current 314 falls below the scalable SCP threshold, the scalable SCP output 532 goes low, in which causes the output 524 of the multiplexer 522 to also go low.

Figure 10:
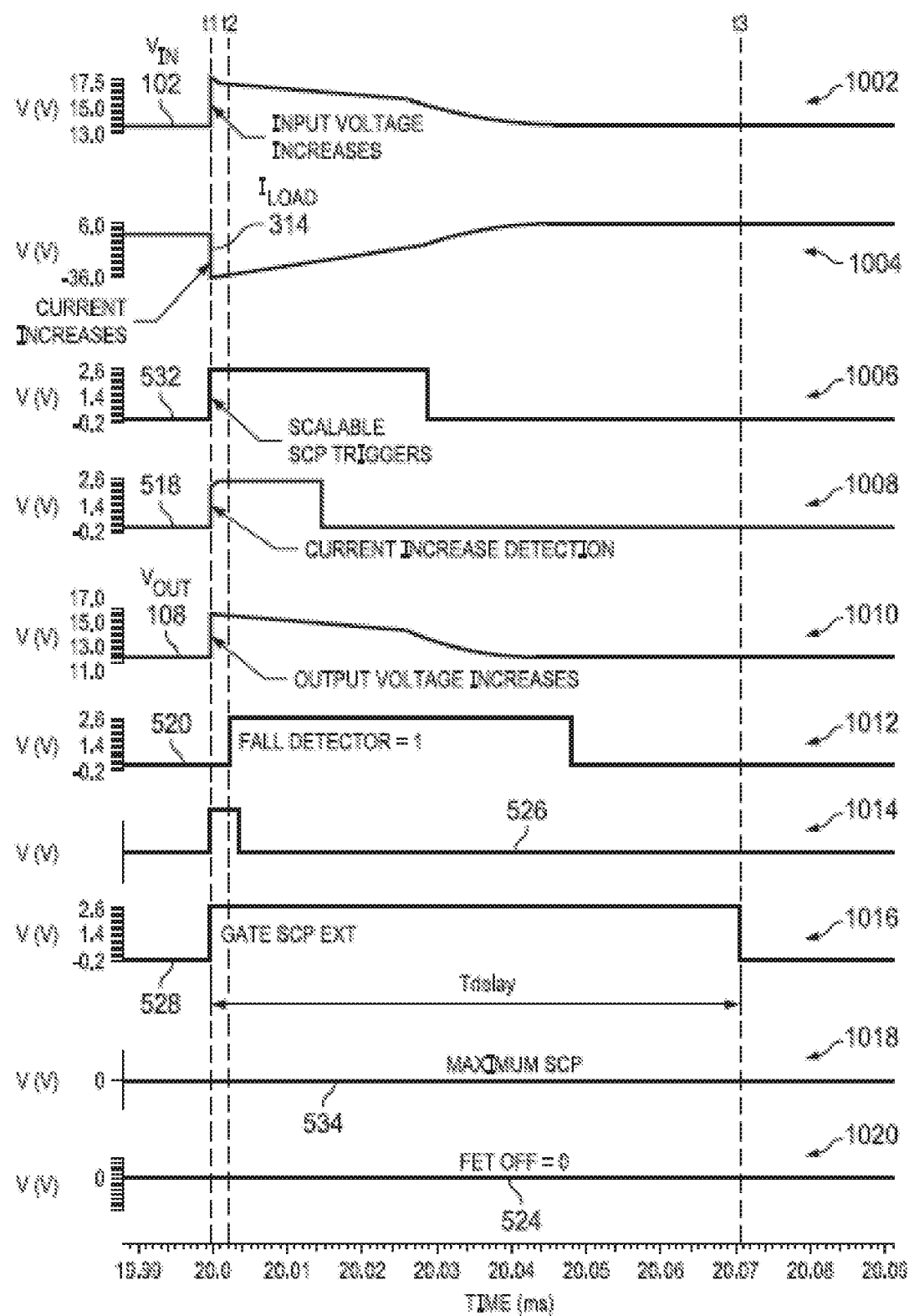
FIG. 10 is a signal plot illustrating a response of the elements of the example block diagram of FIG. 5A when a transient occurs at an input.

FIG. 10 illustrates an example timing diagram 1000 depicting the response of the example system 500 diagram when a supply transient occurs. The example timing diagram 1000 of includes the example second graph 902, the example third graph 1004, the example fourth graph 1006, the example fifth graph 1008, an example sixth graph 1010, an example seventh graph 1012, an example eighth graph 1014, an example ninth graph 916, the example tenth graph 1018, and an example eleventh graph 1020. The example second graph 1002 illustrates the example input voltage 102, the example third graph 1004 illustrates the example load current 314, the example fourth graph 1006 illustrates the example scalable SCP output 532, the example fifth graph 1008 illustrates the example first output 518 of the current increase detector 504, the example sixth graph 1010 illustrates the output voltage 108, the example seventh graph 1012 illustrates the second output 520 of the vout fall detector 506, the example eighth graph 1014 illustrates the determining output 526 of the example logic gate 508, the example ninth graph 1016 illustrates the selecting input 528 of the example pulse extender 510, the example tenth graph 1018 illustrates the maximum SCP output 534, and the example eleventh graph 1020 illustrates the output 524 of the example multiplexer 522.

In the example second graph 1002, the input voltage 102 increases at time t1. The input voltage 102 may increase due to a removal of a second power path 106 from the power supply circuit 300 and a resulting supply transient. In response to the supply transient, the load current depicted in the third graph 1004 increases at time t1. When the load current 314 increases, the scalable SCP 512 is triggered and the scalable SCP output 532 goes high at time t1. The example current increase detector 504 also detects the increase in load current 314 at time t1 and outputs a high on the first output 518 as illustrated in the example fifth graph 1008.

In response to the supply transient, the output voltage 108 increases at time t1, which indicates that the load 110 is experiencing a supply transient and not a short. In this manner, the example system 500 diagram blocks scalable SCP 512 to avoid an undesirable removing of power from the load 110 via the powerFET 530. At time t1, when the output voltage 108 increases, illustrated in the sixth graph 1010, the vout fall detector 506 outputs a low at time t1 on the second output 520 as illustrated in graph 1012. The low on the second output 520 is provided to the inverting input of the logic gate 508, which inverts the low to a high, and further outputs a high on the determining output 526 as illustrated in the example eighth graph 1014. The determining output 526 goes low at time t2 as a response to the output voltage 108 decreasing. However, the short period of time between t1 and t2, wherein the determining output 526 was high, was enough time to provide the high pulse to the example pulse extender 510.

The example pulse extender 510 extends the high pulse on the selecting input 528 for a time n. The selecting input 528 remains high (e.g., a logic 1) and is provided to the example multiplexer 522 to select the maximum SCP output 534. The maximum SCP output 534 is illustrated in the example tenth graph 1018 as zero volts. The zero volts on the maximum SCP output 534 indicates that the increase in load current 314 did not meet (e.g., exceed) the threshold (e.g., the maximum current limit) set by the manufacturer. Therefore, the multiplexer 522 provides the output 524 of zero volts to the example gate driver 540, wherein the gate driver 540 does not switch off the example powerFET 530. At time t3, the pulse extender 510 outputs a low signal on the selecting input 528, wherein the load current 314 is at the initial amperage before the supply transient, and power to the load 110 was not erroneously removed.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example methods, apparatus and articles of manufacture have been disclosed that detect a supply transient versus an output short to enable short circuit protection when a valid fault condition occurs. Example methods, apparatus, and articles of manufacture also include fast response time to increasing load current to protect a load from damaging currents.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a voltage detection circuit having a detector voltage input, having a voltage detection input coupled to one of an output terminal and an input terminal, and having a voltage detect output;
    a pulse extender circuit having a first extender input coupled to the voltage detect output, a second extender input coupled to a current monitor having an output responsive to an input current and an output current, and having a pulsed output;
    a multiplexer having a select input coupled to the pulsed output, having a first input, having a second input, and having a gate driver output; and
    a power transistor having a gate input coupled to the gate driver output, having a first current terminal coupled to the input terminal, and having a second current terminal coupled to the output terminal.

2. The apparatus of claim 1, in which the apparatus includes a current sensor circuit having inputs coupled to the input terminal and the output terminal and having a current sensor output coupled to the extender input.

3. The apparatus of claim 2 in which the current sensor circuit includes a current increase detector circuit having an input coupled to the current sensor output and having a current increase output coupled to the extender input.

4. The apparatus of claim 3 including a logic gate having an input coupled to the current increase output, having an input coupled to the voltage detect output, and having a gated output coupled to the extender input.

5. The apparatus of claim 1, including a first short circuit protection circuit having an output coupled to the multiplexer first input and including a second short circuit protection circuit having an output coupled to the multiplexer second input.

6. The apparatus of claim 1, in which the voltage detection circuit is an output voltage fall detector circuit and the voltage detection input is coupled to the output terminal.

7. The apparatus of claim 1, in which the voltage detection circuit is an input voltage rise detector and the voltage detection input is coupled to the input terminal.

8. An apparatus comprising:
a current monitor having inputs coupled to an input terminal and to an output terminal and having a current monitor output responsive to an input current and an output current;
a voltage detection device having an input coupled to one of the input terminal and the output terminal and having a voltage detect output;
a logic gate having an input coupled to the current monitor output, having an input coupled to the voltage detect output, and having a gated output;
a pulse extender having an input coupled to the gated output and having an extended gated output;
a multiplexer having a select input coupled to the extended gated output and having a gate output; and
a power transistor having a gate input coupled to the gate output, having a first current terminal coupled to the input terminal, and having a second current terminal coupled to the output terminal.

9. The apparatus of claim 8 in which the multiplexer has a first protection device input and a second protection device input.

10. The apparatus of claim 8, in which a first protection device input is to be enabled when an output current meets a first threshold, and a second protection device input is to be enabled when the output current meets a second threshold.

11. The apparatus of claim 8, in which the voltage detection device converts a high voltage to a low voltage.

12. The apparatus of claim 8, in which the voltage detection device is an input voltage rise detector and the voltage detection input is coupled to the input terminal.

13. The apparatus of claim 8, in which the voltage detection device is an output voltage fall detector circuit and the voltage detection input is coupled to the output terminal.

14. A system comprising:
a current increase detection circuit having inputs coupled to an input terminal and to an output terminal, and having a current increase output responsive to a current at the input terminal and a current at the output terminal;
a voltage detection device having a voltage detect input coupled to one of the input terminal and the output terminal and having a voltage detect output;
a logic gate having a first input coupled to the current increase output, having a second input coupled to the voltage detect output, and having a gated output;
a pulse extender having an input coupled to the gated output and having an extended gated output;
a scalable short circuit protection circuit having a scalable short circuit output;
a maximum short circuit protection circuit having a maximum short circuit output;
a multiplexer having a select input coupled to the extended gated output, having a first input coupled to the scalable short circuit output, having a second input coupled to the maximum short circuit output, and having a driver output;
a gated driver circuit having an input coupled to the driver output and having a gate output; and
a power transistor having a gate input coupled to the gate output, having a first current terminal coupled to the input terminal, and having a second current terminal coupled to the output terminal.

15. The system of claim 14, in which the voltage detection device is an output voltage fall detector circuit and the voltage detect input is coupled to the output terminal.

16. The system of claim 14 in which the voltage detection device is an input voltage rise detector and the voltage detect input is coupled to the input terminal.

* * * * *